(12) United States Patent
Kurpejovic et al.

(10) Patent No.: US 11,161,080 B2
(45) Date of Patent: Nov. 2, 2021

(54) MIXER FOR AN EXHAUST SYSTEM COMPRISING TWO OPPOSITELY BENT AREAS

(71) Applicant: Eberspächer Exhaust Technology GmbH & Co. KG, Neunkirchen (DE)

(72) Inventors: Enver Kurpejovic, Kirchheim (DE); Krishna Kumar Vempati, Esslingen (DE); Krishna Siva Prasad Reddy Yenugula, Esslingen (DE); Ruben Hass, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 147 days.

(21) Appl. No.: 16/538,058

(22) Filed: Aug. 12, 2019

(65) Prior Publication Data

US 2020/0047136 A1 Feb. 13, 2020

(30) Foreign Application Priority Data

Aug. 13, 2018 (DE) .......................... 102018119578.8

(51) Int. Cl.
| | | |
|---|---|---|
| *B01F 3/04* | (2006.01) | |
| *B01F 5/04* | (2006.01) | |
| *F01N 3/28* | (2006.01) | |
| *B01F 5/06* | (2006.01) | |
| *B01F 5/00* | (2006.01) | |

(52) U.S. Cl.
CPC .................. *B01F 3/04* (2013.01); *B01F 5/04* (2013.01); *B01F 5/0688* (2013.01); *F01N 3/2892* (2013.01); *B01F 2005/0091* (2013.01); *B01F 2215/0042* (2013.01); *F01N 2240/20* (2013.01); *F01N 2610/02* (2013.01); *Y02T 10/12* (2013.01)

(58) Field of Classification Search
CPC ........................... F01N 2240/20; F01N 3/2892
See application file for complete search history.

(56) References Cited

U.S. PATENT DOCUMENTS

| | | | |
|---|---|---|---|
| 8,033,104 B2 | 10/2011 | Zhang | |
| 10,767,537 B1* | 9/2020 | Li | .......... F02D 41/1459 |
| 2010/0005790 A1* | 1/2010 | Zhang | ........................ F01N 3/36 |
| | | | 60/301 |
| 2010/0132345 A1* | 6/2010 | Solbrig | .................. B01F 5/0268 |
| | | | 60/301 |
| 2011/0094206 A1 | 4/2011 | Liu et al. | |
| 2014/0286832 A1* | 9/2014 | Yi | ........................ B01F 3/04049 |
| | | | 422/176 |

(Continued)

FOREIGN PATENT DOCUMENTS

| | | | | |
|---|---|---|---|---|
| CN | 107178406 A | | 9/2017 | |
| DE | 102008042536 A1 * | | 4/2009 | ............ B01F 5/0616 |

(Continued)

*Primary Examiner* — Laert Dounis
(74) *Attorney, Agent, or Firm* — McGlew and Tuttle, P.C.

(57) ABSTRACT

A mixer for an exhaust system for mixing reactant injected into an exhaust gas stream with exhaust gas includes a mixer body (22). The mixer body includes a reactant passage body area (24) with a reactant passage opening (26), a mixer plate body area (30) adjoining the reactant passage body area (24) on one side in a mixer longitudinal direction (L) and a mixer main body area (36) adjoining the reactant passage body area (24) in the mixer longitudinal direction (L) on another side opposite the one side.

20 Claims, 4 Drawing Sheets

(56) References Cited

U.S. PATENT DOCUMENTS

| | | | | |
|---|---|---|---|---|
| 2015/0267587 A1* | 9/2015 | Calvo | ............... | F01N 3/2066 |
| | | | | 60/301 |
| 2016/0319723 A1 | 11/2016 | Alano et al. | | |
| 2017/0260888 A1* | 9/2017 | Solipuram | ............ | B01F 5/0688 |
| 2018/0080360 A1 | 3/2018 | Kurpejovic et al. | | |
| 2019/0017426 A1* | 1/2019 | Zhang | ............... | B01F 5/0688 |
| 2020/0217233 A1* | 7/2020 | Wang | ................... | F01N 3/2892 |

FOREIGN PATENT DOCUMENTS

| | | |
|---|---|---|
| DE | 102013223033 A1 | 5/2015 |
| DE | 102016104361 A1 | 9/2017 |
| DE | 102016117746 A1 | 3/2018 |
| EP | 3 216 992 A1 | 9/2017 |
| EP | 3321484 A1 | 5/2018 |
| EP | 3379046 A1 * 9/2018 ............ B01F 5/0268 |
| GB | 2 512 934 A | 10/2014 |
| JP | H03206314 A | 9/1991 |
| WO | 2012/089290 A1 | 7/2012 |

* cited by examiner

MIXER FOR AN EXHAUST SYSTEM COMPRISING TWO OPPOSITELY BENT AREAS

CROSS REFERENCE TO RELATED APPLICATIONS

This application claims the benefit of priority under 35 U.S.C. § 119 of Application 10 2018 119 578.8, filed Aug. 13, 2018, the entire contents of which are incorporated herein by reference.

TECHNICAL FIELD

The present invention pertains to a mixer, which can be used in an exhaust system of an internal combustion engine to bring about an improved mixing of reactant injected into the exhaust gas stream.

TECHNICAL BACKGROUND

Such a mixer known from German Patent Application 10 2016 104 361 has an essentially disk-like shape and is composed of two disk parts configured with approximately circular circumferential contour. The disk parts are shaped such that they provide a duct for receiving reactant. The exhaust gas flowing around the mixer can enter this duct and thus become mixed with the injected reactant, for example, a urea/water solution. Release ducts, which are formed between the two disk parts and via which the mixture of reactant and exhaust gas can flow into the part of an exhaust system that follows in the downstream direction.

SUMMARY

An object of the present invention is to provide a mixer for an exhaust system for mixing reactant injected into an exhaust gas stream with exhaust gas, which mixer has a structurally simple configuration and can bring about an efficient mixing.

This object is accomplished according to the present invention by a mixer for an exhaust system for mixing reactant injected into an exhaust gas stream with exhaust gas, comprising a mixer body with a reactant passage body area with a reactant passage opening, with a mixer plate body area adjoining the reactant passage body area on one side in a mixer longitudinal direction and with a mixer main body area adjoining the reactant passage body area on another side opposite the one side in the mixer longitudinal direction.

It becomes possible with this configuration of a mixer to provide the mixer as one piece of material and to provide the different functional areas thereof by corresponding shaping.

The configuration may, for example, be such that the mixer body is uncurved in the reactant passage body area or/and in the mixer plate body area.

Provisions may be made for the integration of a mixer configured according to the present invention into an exhaust gas pipe, for example, for the mixer plate body area to be bent in a first bending area in a first bending direction in relation to the reactant passage body area, or/and for the mixer main body area to be bent in a second bending area in relation to the reactant passage body area in a second bending area, wherein the first bending direction is opposite the second bending direction, or/and for a plurality of passage openings to be provided in the second bending area.

In order to make it possible to achieve a corresponding orientation of the mixer main body area in relation to the reactant passage body area for a defined mixing of reactant and exhaust gas, it is proposed that the mixer main body area be bent more greatly in relation to the reactant passage body area in the second bending area than the mixer plate body area is bent in the first bending area in relation to the reactant passage body.

For a sufficient flow of exhaust gas around the mixer, the mixer body may be broader in the reactant passage body area at right angles to the mixer longitudinal direction than in the mixer plate body area, or/and the reactant passage opening provided in the reactant passage body area may be broader at right angles to the mixer longitudinal direction than the mixer plate body area.

The mixing of exhaust gas and reactant may be supported by a plurality of passage openings being provided in the mixer plate body area.

To mix the reactant flowing in the direction of the mixer main body area with the exhaust gas flowing around the mixer efficiently, it is proposed that the mixer body have a deflecting ridge area located facing the reactant passage opening in the mixer main body area and a mixing surface area extending starting from the deflecting ridge area in the direction away from the reactant passage opening on both sides of the deflecting ridge area at right angles to the mixer longitudinal direction.

In order to achieve a high efficiency of the mixing surface areas, provisions may be made for the two mixing surface areas to diverge starting from the deflecting ridge area at right angles to the mixer longitudinal direction, or/and for a plurality of passage openings to be provided in the mixing surface areas.

For a configuration that can be embodied in a structurally simple manner, the deflecting ridge area may extend in the direction away from the reactant passage body area starting from the second bending area. As an alternative or in addition, provisions may be made for the deflecting ridge area to extend essentially straight in a first length area starting from the second bending area and to extend essentially straight in a second length area, which adjoins the first length area and is bent in relation to this.

It is proposed for an intensified mixing with a sufficient passage area that the deflecting ridge area have a plurality of passage openings in the second length area, or/and that the deflecting ridge area have no passage openings in the first length area.

Swirling of the exhaust gas stream, which brings about the mixing of reactant and exhaust gas, may be generated, for example, by the mixer main body area having a deflecting surface area, which adjoins each mixing surface area and is bent in relation to this.

Provisions may be made in this connection for the deflecting surface areas to extend, starting from the area at which the first length area of the deflecting ridge area adjoins the second bending area, along the mixing surface areas to an end of the second length area of the deflecting ridge area, which said end is located at a distance from the first length area.

In order to support a defined flow in the direction of the mixer main body area, it is proposed that a flow guide element formation extending in the direction of the mixer main body area be provided, surrounding the reactant passage opening, at the reactant passage body area.

Based on the structurally simple configuration, it is possible to configure the mixer body in one piece or/and to build it from a sheet metal part.

The present invention further pertains to an exhaust system for an internal combustion engine, comprising an exhaust gas pipe, a reactant release device releasing reactant into the exhaust gas pipe in a main reactant release direction and a mixer configured according to the present invention.

In order to bring about an efficient mixing of the reactant with the exhaust gas, it is proposed that the mixer be arranged in the exhaust gas pipe such that the main reactant release direction is directed through the reactant passage opening towards the mixer main body area.

The mixer plate body area may be arranged in a main exhaust gas flow direction in the exhaust gas pipe upstream in relation to the reactant passage body area. Further, the mixer main body area may be arranged essentially at right angles to the main exhaust gas flow direction in the exhaust gas pipe.

The present invention will be described below in detail with reference to the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a view of the mixer according to FIG. 2 in viewing direction V in

FIG. 1;

FIG. 6 is a view of the mixer according to FIG. 2 in viewing direction VI in

FIG. 1;

DESCRIPTION OF PREFERRED EMBODIMENTS

Figure 1:
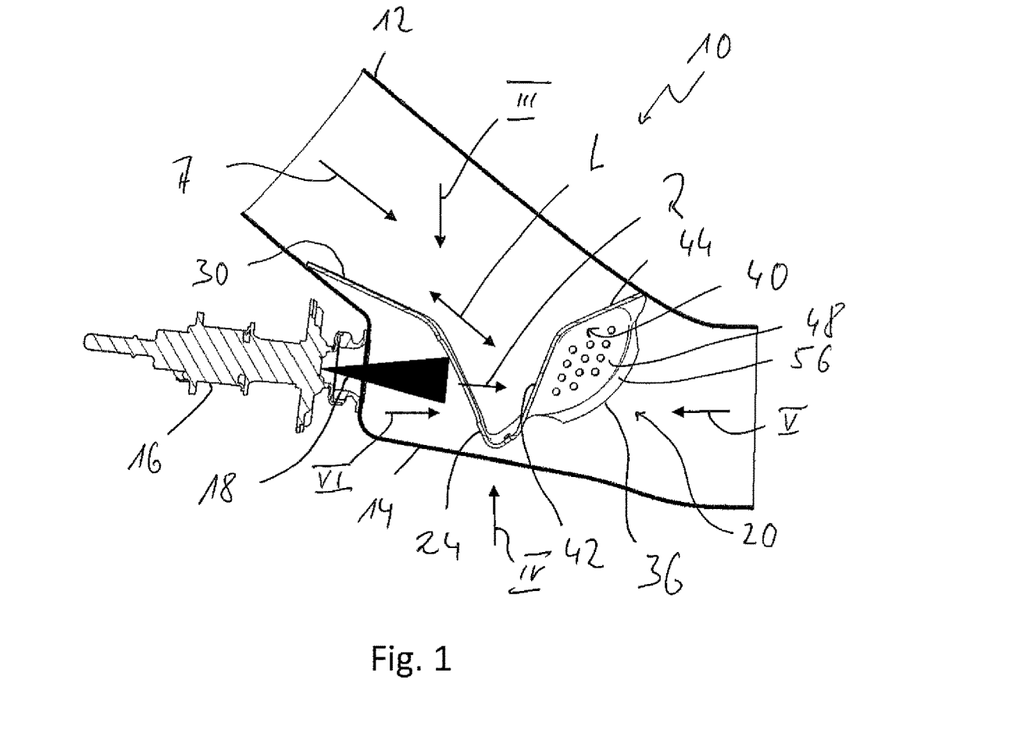
FIG. 1 is a longitudinal sectional view of an exhaust system with a reactant release device and with a mixer.

Referring to the drawings, in a longitudinal sectional view, FIG. 1 shows a section of an exhaust system generally designated by 10 for an internal combustion engine of a vehicle. This exhaust system 10 comprises an exhaust gas pipe 12, in which the exhaust gas discharged by an internal combustion engine flows in a main exhaust gas flow direction A. A reactant release device 16, generally also called injector, is provided in a lateral bulge area 14 on the exhaust pipe 12 such that this injects the reactant to be injected into the exhaust gas into the exhaust gas stream in the form of a spray cone 18 in a main reactant release direction R. Based on the circumstance that the reactant release device 16 is connected to the exhaust gas pipe 12 in the lateral bulge area 14, the main exhaust gas flow direction A and the main reactant release direction R are not parallel to one another, but they form an angle in the range of about 45° with one another.

Further, a mixer, which is generally designated by 20 and will also be described in detail below with reference to FIGS. 2 through 6, is provided in the exhaust gas pipe. 12. The mixer 20 is used to achieve an improved mixing of exhaust gas flowing in the exhaust gas pipe 12 with reactant, i.e., for example, a urea/water solution, which is also injected into the exhaust gas stream, so that an efficient exhaust gas purification can also be brought about in an SCR catalytic converter device following downstream.

The mixer 20 comprises a mixer body 22 preferably formed from a single piece of sheet metal. It can be cut out for this purpose from a sheet metal plate blank for the mixer body 22, provided with the different openings yet to be explained below, and then brought to the shape yet to be explained below by a shaping process.

Figure 2:
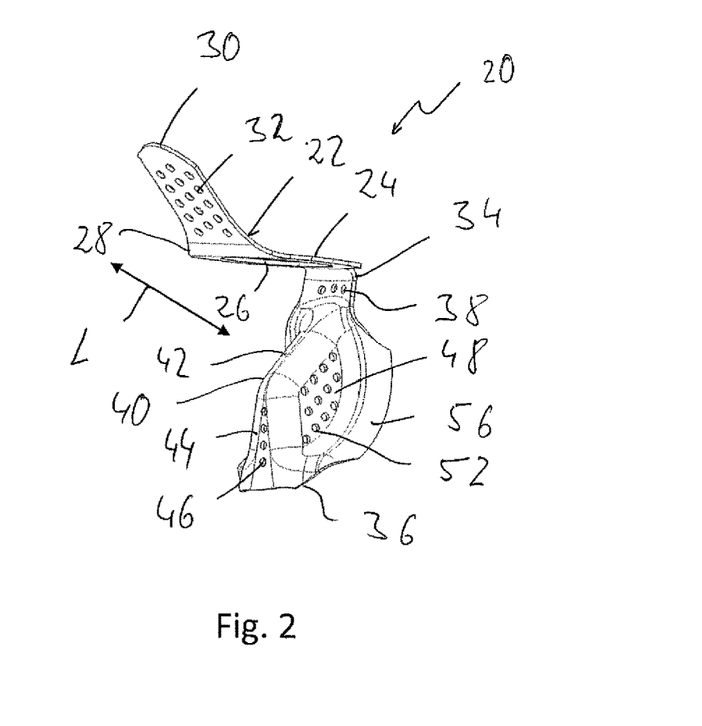
FIG. 2 is a perspective view of the mixer of the exhaust system according to FIG. 1.

The mixer body 22 comprises as the central area a reactant passage body area 24. This reactant passage body area 24, which has an essentially flat, i.e., uncurved configuration, provides a reactant passage opening 26, which has, for example, a circular or angular contour. A mixer plate body area 30, which likewise has an essentially flat, i.e., uncurved configuration, adjoins on one side of the reactant passage body area 24 in a mixer longitudinal direction L in a first bending area 28. A plurality of passage openings 32, arranged, for example, in three rows, are provided in the mixer plate body area 30. A mixer main body area generally designated by 36 adjoins on the other side of the reactant passage body area 24 in the mixer longitudinal direction L in a second bending area 34. FIGS. 1 and 2 show clearly that the mixer body 22 is bent in opposite directions in the two bending areas 28, 34. Further, it can clearly be seen that the mixer plate body area 30 is bent to a lesser extent in relation to the reactant passage body area 24 in the first bending area 28 than the mixer main body area 36 is bent in the second bending area 34 in relation to the reactant passage body area 24. While the bending in the first bending area 28 may, for example, be smaller than 45°, the bending provided in the opposite direction in the second bending area 34 is in the range of 90° or higher.

Figure 3:
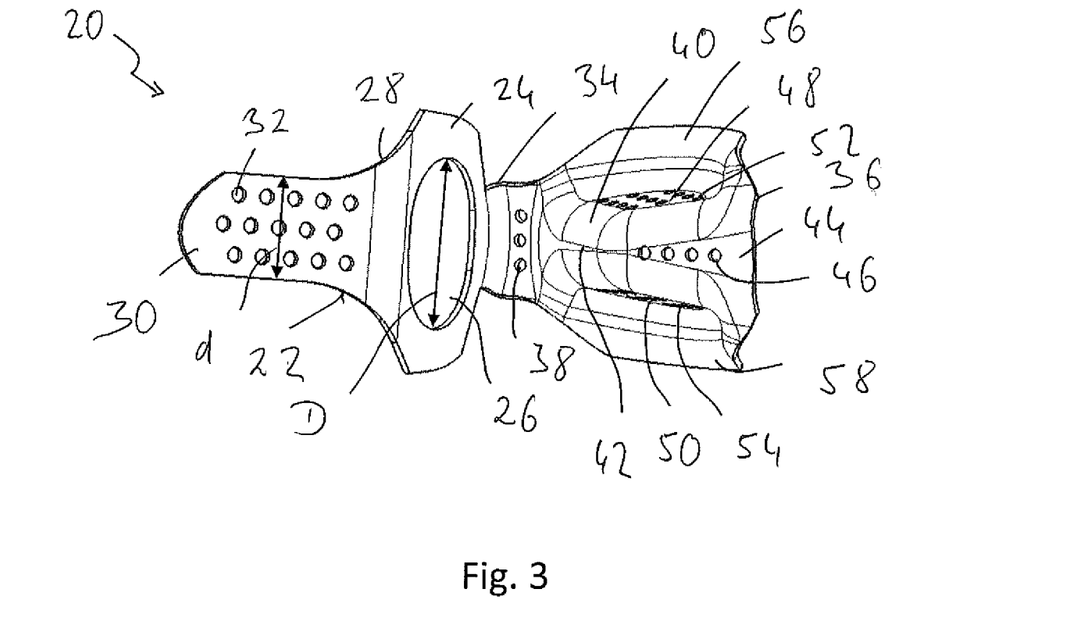
FIG. 3 is a view of the mixer according to FIG. 2 in viewing direction III in FIG. 1.
Figure 4:
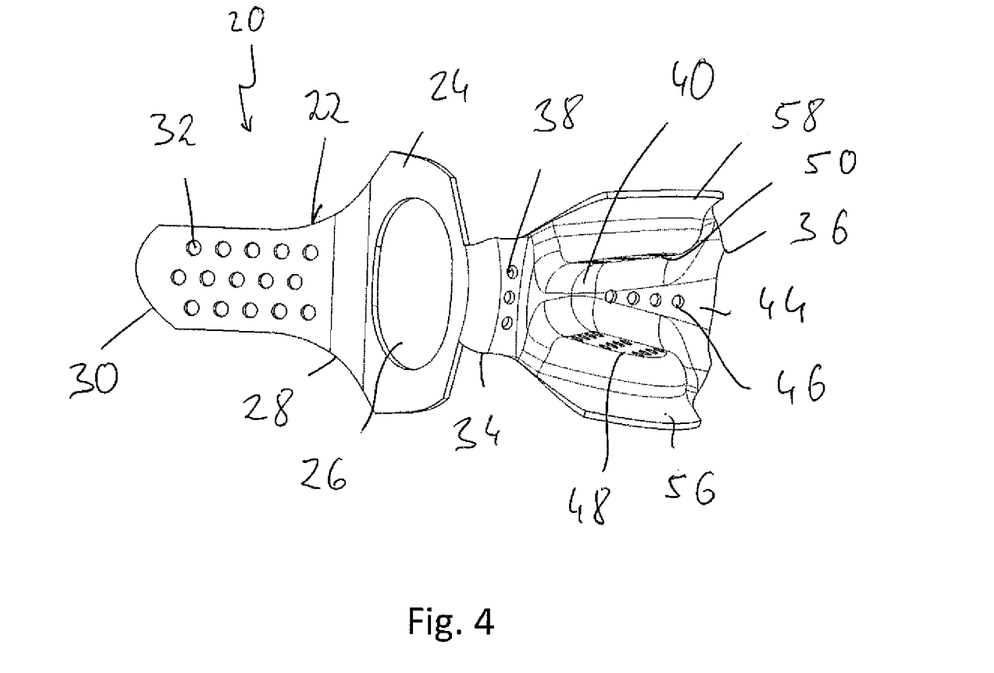
FIG. 4 is a view of the mixer according to FIG. 2 in viewing direction IV in FIG. 1.
Figure 5:
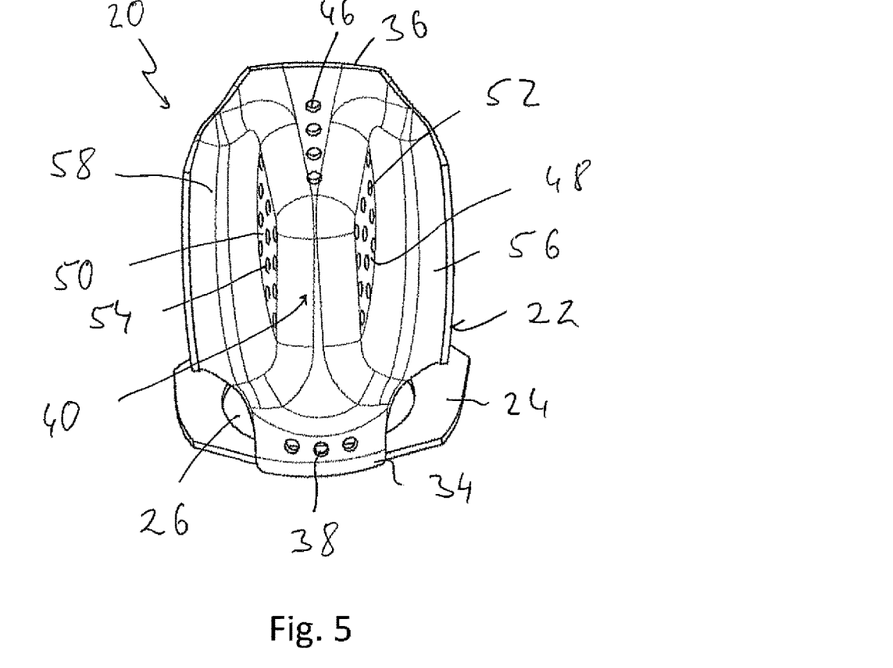
Figure 6:
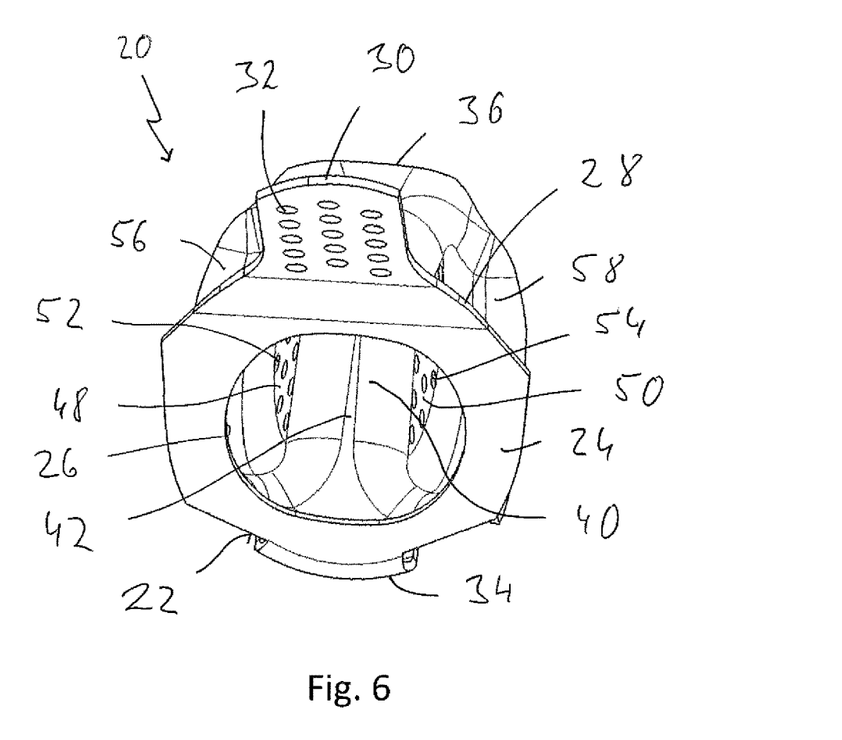

FIGS. 3 and 4 show clearly that the width d of the mixer plate body area 30 at right angles to the mixer longitudinal direction L is smaller than the width D of the reactant passage opening 26 measured at right angles to the mixer longitudinal direction L. The mixer plate body area 30 covers in this manner the areas following in the flow direction only partially in the case of the positioning of the mixer 20 as shown in FIG. 1 in the exhaust gas pipe 12 and this body area offers only a partial shielding against the incoming exhaust gas flow.

The mixer main body area 36 is shaped such that, starting from the second bending area 34, in which passage openings 38 may likewise be provided, it has a deflecting ridge area 40 oriented in the direction of the reactant passage opening 26 or the reactant passage body area 24. The deflecting ridge area 40 has a first length area 42, which extends essentially straight starting from the second bending area 34, and a second length area 44 extending essentially straight adjoining the first length area 42. While no passage openings may be provided, for example, in the first length area 42 of the deflecting ridge area 40, a plurality of passage openings 46 are provided in the second length area 44.

Mixing surface areas 48, 50 adjoin the first length area 42 on both sides and angled to the mixer longitudinal direction L. These mixing surface areas 48, 50 extend, starting from the deflecting ridge area 40, in the direction away from the reactant passage body area 24 and away from the mixer longitudinal direction L, so that the mixer main body area 36 has an increasing width in the flow direction when viewed in the mixer longitudinal direction L. A plurality of passage openings 52, 54 are provided in each of the mixing surface areas 48, 50.

A deflecting surface area 56, 58, which is bent in relation to the respective associated mixing surface area 48, 50, i.e., which extends essentially away from associated mixing surface area 48, 50 transverse to the mixer longitudinal direction L, is provided adjoining each mixing surface area 48, 50. The deflecting surface areas 56, 58 extend, starting from the area in which the deflecting ridge area 40 adjoins the second bending area 34, along the mixing surface areas 48, 50 to an end of the second length area 44 of the deflecting ridge area 40, which end is located at a distance from the first length area 42 of the deflecting ridge area 40. The deflecting surface areas 56, 58 thus have a curved contour adapted to the shape of the mixing surface areas 48, 50.

The mixer 20 is inserted into the exhaust gas pipe 12 such that the mixer plate body area 30 is in contact, in an end that is located at a distance from the reactant passage body area 24, with the inner side of the exhaust gas pipe 12 upstream of the bulge 40 and is fixed there, for example, by welding or the like. The mixer 20 is positioned relative to the reactant release device 16 The mixer main body area 36 has an end, located at a distance from the second bending area 34, in contact with an opposite side of the exhaust gas pipe 12 at the inner surface thereof, that is fixed there, for example, likewise by welding. The reactant passage body area 24 is positioned or oriented with the reactant passage opening 26 such that the reactant passage body area 24 allows, by interacting with the bulge 14 in some areas, passage of the reactant introduced in the form of the spray cone 18 in the direction of the deflecting ridge area 40 of the main reactant body area 36. The reactant passage body area 24 is dimensioned at right angles to the mixer longitudinal direction L such that on both sides of the reactant passage opening 26, it is in contact with the inner surface of the exhaust gas pipe 12 by lateral edge areas and is fixed there, for example, by welding to the exhaust gas pipe 12.

Exhaust gas flowing through the mixer plate body area 30 in the area of the passage openings 32 and flowing past same laterally can flow into the area of the spray cone 18 in the area in front of the passage through the reactant passage opening 26 and can bring about mixing with the reactant in the area in front of the passage through the reactant passage opening 26. The reactant stream reaching the deflecting ridge area 40 is split due to the structure of the main reactant body area 36, which structure is curved convexly in the upstream direction and is guided along the two mixing surface areas 48, 50 in the direction of the deflecting surface areas 56, 58. Swirling, which brings about an efficient mixing of the reactant with the exhaust gas, which is also flowing in the main exhaust gas flow direction A towards the mixer main body area 36, is generated here. A part of the exhaust gas mixed with reactant can now flow already through the passage openings 38, 52, 54 and 46. Another part of the mixture of exhaust gas and reactant can flow, deflected laterally outward by the deflecting surface areas 56, 58, around the mixer main body area 36 and flow into the area of the exhaust gas pipe 12, which area then follows downstream, in the direction of an SCR catalytic converter device.

The above-described, comparatively narrow configuration of the mixer plate areas 30 compared to the reactant passage body area 24 and the incoming flow of exhaust gas to the reactant passage body area 24 on both sides thereof, which flow is made possible thereby, makes possible an efficient heating of the entire mixer body 22, so that intensified evaporation of the reactant reaching the surface of the mixer body can be brought about as well. A part of the exhaust gas stream can flow around the mixer body 22 on the outside in the area of the second bending area 34, i.e., between this mixer body 22 and the exhaust gas pipe 12, so that only an exhaust gas stream mixed with a low percentage of reactant will reach the downstream side of the mixer main body area 36 and this exhaust gas stream will lead there, based on the swirling generated by means of the deflecting surface areas 56, 58, to an efficient mixing of the exhaust gas stream, which is arriving from the area of the mixer main body area 36 and has a high reactant concentration.

Figure 7:
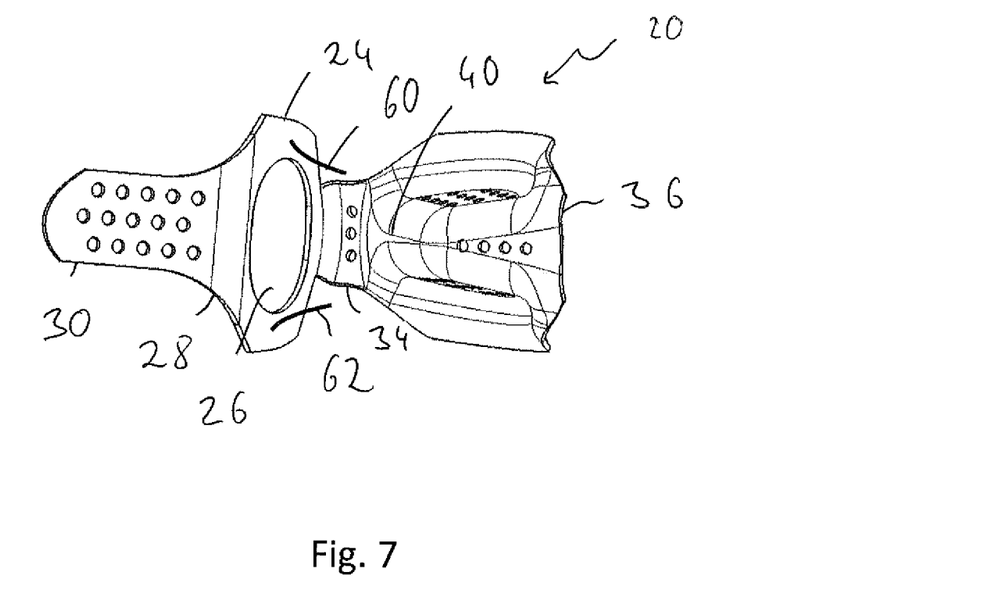
FIG. 7 is a view, corresponding to the view of FIG. 3, of an alternative embodiment of the mixer.
Figure 8:
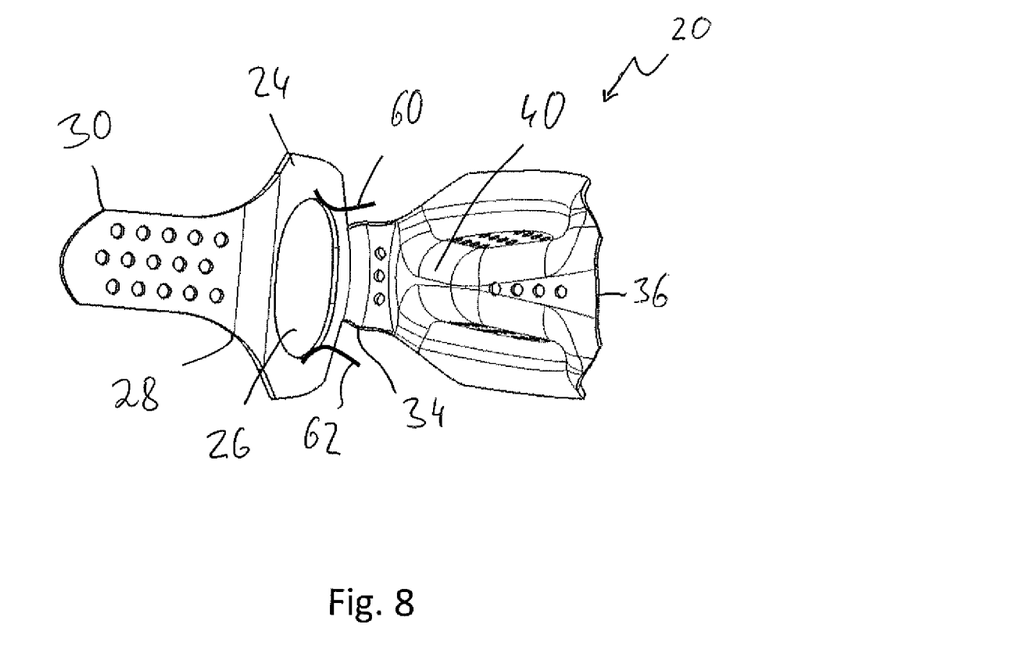
FIG. 8 is another view, corresponding to the view FIG. 3, of an alternative embodiment of the mixer.

FIGS. 7 and 8 show modified embodiments of the mixer 12. It is seen in FIG. 7 that deflecting elements 60, 62 formed, for example, integrally are provided at the reactant passage body area 24 on both sides of the reactant passage opening 26 formed therein. These deflecting elements 60, 62 are shaped such that they converge towards one another in the main reactant release direction R and an intensified flow deflection can thus act in the direction of the deflecting ridge area 40 of the mixer main body area 36. It is apparent that more than two such deflecting elements, which may be provided, for example, by bending over corresponding straps left in place on the inner circumference of the reactant passage opening 26, may be provided here following one another.

The deflecting elements 60, 62 are shaped in the embodiment shown in FIG. 8 such that, at first converging toward one another, they contract the flow cross section and then provide for a widening of the flow cross section due to a diverging arrangement. Acceleration of the stream of reactant and also exhaust gas passing through the reactant passage opening 26 is achieved based on the Venturi effect brought about in this manner.

A funnel-shaped deflecting formation may also be provided by drawing the mixer body 22 in the reactant passage body area 24 and forming this formation in one piece.

While specific embodiments of the invention have been shown and described in detail to illustrate the application of the principles of the invention, it will be understood that the invention may be embodied otherwise without departing from such principles.

What is claimed is:

1. A mixer for an exhaust system for mixing reactant injected into an exhaust gas stream with exhaust gas, the mixer comprising a mixer body, the mixer body being made of a sheet metal part in a one-piece configuration and the mixer body comprising:
   a reactant passage body area with a reactant passage opening;
   a mixer plate body area adjoining the reactant passage body area on a first mixer body side in a mixer longitudinal direction; and
   a mixer main body area adjoining the reactant passage body area on a second mixer body side, the second mixer body side being opposite the first mixer body side in the mixer longitudinal direction, wherein the mixer plate body area is bent in a first bending direction in a first bending area in relation to the reactant passage body area and the mixer main body area is bent in a second bending direction in a second bending area in relation to the reactant passage body area, the first bending direction being opposite the second bending direction, wherein the mixer body further comprises:
a deflecting ridge area located facing the reactant passage opening in the mixer main body area; and
mixing surface areas provided on each of both sides of the deflecting ridge area transversely with respect to the mixer longitudinal direction and extending starting from the deflecting ridge area away from the reactant passage opening.

2. The mixer in accordance with claim 1, wherein:
the mixer body is essentially uncurved in the reactant passage body area; or
the mixer body is essentially uncurved in the mixer plate body area; or
the mixer body is essentially uncurved in both the reactant passage body area and the mixer plate body area.

3. The mixer in accordance with claim 1,
wherein a plurality of passage openings are provided in the second bending area.

4. The mixer in accordance with claim 1, wherein the mixer main body area is bent in a larger extent in the second bending area in relation to the reactant passage body area than the mixer plate body area is bent in the first bending area in relation to the reactant passage body area.

5. The mixer in accordance with claim 1, wherein:
the mixer body is broader in the reactant passage body area at right angles to the mixer longitudinal direction than in the mixer plate body area; or
the reactant passage opening provided in the reactant passage body area is broader than the mixer plate body area at right angles to the mixer longitudinal direction; or
the mixer body is broader in the reactant passage body area at right angles to the mixer longitudinal direction than in the mixer plate body area and the reactant passage opening provided in the reactant passage body area is broader than the mixer plate body area at right angles to the mixer longitudinal direction.

6. The mixer in accordance with claim 1, wherein a plurality of passage openings are provided in the mixer plate body area.

7. The mixer in accordance with claim 1, wherein:
a plurality of passage openings are provided in the mixing surface areas.

8. The mixer in accordance with claim 1,
wherein the deflecting ridge area extends starting from the second bending area in the direction away from the reactant passage area.

9. The mixer in accordance with claim 1, wherein the mixer main body area has, adjoining each mixing surface area, a deflecting surface area bent in relation to this mixing surface area.

10. The mixer in accordance with claim 1, wherein the mixer body further comprises a flow guide element formation at the reactant passage body area, the flow guide element formation surrounding the reactant passage opening and extending in a direction of the mixer main body area.

11. The mixer in accordance with claim 1, wherein:
the deflecting ridge area extends essentially straight starting from the second bending area in a first length area and extends essentially straight in a second length area, which adjoins the first length area and is bent in relation to this length area; or
the deflecting ridge area extends starting from the second bending area in the direction away from the reactant passage area and extends essentially straight starting from the second bending area in a first length area and extends essentially straight in a second length area, which adjoins the first length area and is bent in relation to this length area.

12. The mixer in accordance with claim 11, wherein:
the deflecting ridge area has a plurality of passage openings in the second length area; or
the deflecting ridge area has no passage openings in the first length area; or
the deflecting ridge area has a plurality of passage openings in the second length area and has no passage openings in the first length area.

13. The mixer in accordance with claim 11, wherein:
the mixer main body area has, adjoining each mixing surface area, a deflecting surface area bent in relation to this mixing surface area;
the deflecting surface areas extend, starting from the area in which the first length area of the deflecting ridge area adjoins the second bending area, along the mixing surface areas to an end of the second length area of the deflecting ridge area, which end is located at a distance from the first length area.

14. An exhaust system for an internal combustion engine, the exhaust system comprising:
an exhaust gas pipe;
a reactant release device releasing reactant in a main reactant release direction into the exhaust gas pipe; and
a mixer arranged in the exhaust gas pipe for mixing reactant injected into an exhaust gas stream with exhaust gas, the mixer comprising a mixer body, the mixer body comprising:
a reactant passage body area with a reactant passage opening;
a mixer plate body area adjoining the reactant passage body area on a first mixer body side in a mixer longitudinal direction; and
a mixer main body area adjoining the reactant passage body area on a second mixer body side, the second mixer body side being opposite the first mixer body side in the mixer longitudinal direction, wherein the mixer plate body area is bent in a first bending direction in a first bending area in relation to the reactant passage body area and the mixer main body area is bent in a second bending direction in a second bending area in relation to the reactant passage body area, the first bending direction being opposite the second bending direction, wherein the mixer body further comprises:
a deflecting ridge area located facing the reactant passage opening in the mixer main body area; and
mixing surface areas provided on each of both sides of the deflecting ridge area transversely with respect to the mixer longitudinal direction and extending starting from the deflecting ridge area away from the reactant passage opening.

15. The exhaust system in accordance with claim 14, wherein the mixer is arranged in the exhaust gas pipe such that the main reactant release direction is directed through the reactant passage opening toward the mixer main body area.

16. The exhaust system in accordance with claim 14, wherein:
the mixer plate body area is arranged in a main exhaust gas flow direction in the exhaust gas pipe upstream in relation to the reactant passage body area; or
the mixer main body area is arranged essentially at right angles to the main exhaust gas flow direction in the exhaust gas pipe; or the mixer plate body area is arranged in a main exhaust gas flow direction in the exhaust gas pipe upstream in relation to the reactant passage body area and the mixer main body area is arranged essentially at right angles to the main exhaust gas flow direction in the exhaust gas pipe.

17. The exhaust system in accordance with claim 14, wherein a plurality of passage openings are provided in the second bending area.

18. The exhaust system in accordance with claim 17, wherein the mixer body further
comprises a plurality of passage openings are provided in the mixing surface areas.

19. A mixer for an exhaust system for mixing reactant injected into an exhaust gas stream with exhaust gas, the mixer comprising:
a mixer body formed of a sheet metal part in one-piece to define a single, one-piece sheet metal mixer body structure, the single, one-piece sheet metal mixer body structure comprising:
a reactant passage body area comprising a reactant passage opening defining a reactant passage inlet and a reactant passage outlet;
a mixer plate body area adjoining the reactant passage body area on a first mixer body side in a mixer longitudinal direction; and
a mixer main body area adjoining the reactant passage body area on a second mixer body side, the second mixer body side being opposite the first mixer body side in the mixer longitudinal direction, wherein the mixer plate body area is bent in a first bending direction in a first bending area relative to the reactant passage body area and the mixer main body area is bent in a second bending direction in a second bending area relative to the reactant passage body area, the first bending direction being opposite the second bending direction, the mixer main body area comprising a deflecting ridge area facing the reactant passage outlet, the deflecting ridge area comprising a first mixing surface area provided on one side of the deflecting ridge area transversely with respect to the mixer longitudinal direction and the deflecting ridge area further comprising a second mixing surface area provided on another side of the deflecting ridge area transversely with respect to the mixer longitudinal direction, each of the first mixing surface area and the second mixing surface area extending starting from the deflecting ridge area, away from the reactant passage opening, the one side of the deflecting ridge area being located opposite the another side of the deflecting ridge area.

20. The mixer in accordance with claim 19, wherein reactant passage body area comprises a flat configuration, the deflecting ridge area facing the reactant passage body area.

\* \* \* \* \*